US 6,778,655 B1

(12) United States Patent
Veschi et al.

(10) Patent No.: US 6,778,655 B1
(45) Date of Patent: Aug. 17, 2004

(54) CALL WAITING CALLER IDENTIFIER

(75) Inventors: John P. Veschi, Fogelsville, PA (US); Phillip D. Mooney, Sellersville, PA (US)

(73) Assignee: Agere Systems Inc., Berkeley Heights, NJ (US)

( * ) Notice: Subject to any disclaimer, the term of this patent is extended or adjusted under 35 U.S.C. 154(b) by 606 days.

(21) Appl. No.: 09/716,286

(22) Filed: Nov. 21, 2000

(51) Int. Cl.[7] .................. H04M 3/42; H04M 1/64; H04M 1/56; H04M 15/06
(52) U.S. Cl. ............... 379/215.01; 379/88.21; 379/142.08; 379/207.16
(58) Field of Search ............... 379/88.19, 88.2, 379/88.21, 142.01, 142.04, 142.06, 142.08, 207.15, 207.16, 215.01

(56) References Cited

U.S. PATENT DOCUMENTS

| 5,263,084 | A | * | 11/1993 | Chaput et al. | 379/215.01 |
| 6,160,877 | A | * | 12/2000 | Tatchell et al. | 379/197 |
| 6,219,414 | B1 | * | 4/2001 | Maciejewski et al. | 379/215.01 |
| 6,233,325 | B1 | * | 5/2001 | Frech et al. | 379/142.06 |
| 6,498,841 | B2 | * | 12/2002 | Bull et al. | 379/142.08 |
| 6,507,646 | B1 | * | 1/2003 | Fishler | 379/215.01 |
| 6,631,188 | B1 | * | 10/2003 | Sands | 379/215.01 |
| 6,633,634 | B1 | * | 10/2003 | Crockett et al. | 379/215.01 |

* cited by examiner

*Primary Examiner*—Binh Tieu
(74) *Attorney, Agent, or Firm*—Dickstein Shapiro Morin & Oshinsky LLP (57) ABSTRACT

A method and apparatus for processing an incoming call during a call-in-progress is disclosed. The method and apparatus provide non-visual indicators to a user indicating the type of incoming caller.

48 Claims, 6 Drawing Sheets

CALL WAITING CALLER IDENTIFIER

BACKGROUND OF THE INVENTION

I. Field of the Invention

The present invention relates generally to the field of telephony. In particular, this invention relates to an apparatus and method for processing incoming calls during a call-in-progress.

II. Description of the Related Art

A call waiting feature which interrupts a call-in-progress is well known in the art. Call waiting enables a called party busy on another call to learn about an incoming call and gives the called party the opportunity to interrupt the ongoing call to accept the incoming call. While call waiting is a useful feature which enables a called party to discontinue lesser important telephone calls in favor of emergency or important calls, subscribers to call waiting may be annoyed by unwanted calls since the typical call waiting feature signals the called party with only a beep or tone to indicate another call is waiting. Furthermore, the original caller or called party may become annoyed when a new caller attempts to interrupt the current call-in-progress.

Caller ID is a service provided by a telephone service provider that provides a user with information regarding an incoming call. Typically, a display associated with a user's telephone, either integrated into the telephone or as part of an adjunct box coupled to the telephone, will display the telephone number and/or name associated with an incoming call. In Type I Caller ID, which operates when the user's telephone is in an on-hook state (i.e., the user is not already engaged in a call-in-progress while the incoming call is arriving), the Caller ID data is provided by a central office of the service provider as frequency shift keying (FSK) data sent between the first and second rings. The user, after the first ring, can thus look at the display to decide, based on the displayed Caller ID information, whether to answer an incoming telephone call.

Type II Caller ID, also known as Caller ID with Call Waiting (CID/CW), operates with the user's telephone in an off-hook state (i.e., already engaged in a telephone call while the incoming call is arriving). In addition to the familiar single audible tone, known as a Subscriber Alert Signal ("SAS tone"), that alerts a user to an incoming call waiting telephone call, the central office provides a Caller ID Alert Signal ("CAS tone") to inform the user's telephone equipment that Caller ID data is about to be transmitted, pending receipt of an acknowledgment from the user's telephone equipment. Based on the CAS tone, the user's telephone briefly mutes its transducers (i.e., microphone and speaker) so that the FSK data is not heard by the user or corrupted by the user's speech. The muting period is sufficiently brief that it does not appreciably disrupt the voice communication between the parties to the conversation. The user, after hearing the SAS tone, can then view the display to determine whether to flash-hook over to the incoming call and temporarily place the existing call into a hold status. The flash-hook operation is accomplished by briefly pressing or activating a switch-hook button, which is normally in a first position, such as down, when the telephone is on-hook, and in a second position, such as up, when the telephone is off-hook, to alert the central office to the desire to switch to the incoming call.

Though it is nice to have Caller ID data displayed on a cordless handset, when a call is in progress, it is inconvenient to read the Caller ID (type 2) data since the user is using the handset for the call-in-progress. To view the Caller ID data the user must interrupt the call-in-progress to look at the Caller ID display. This is disruptive to the call-in-progress.

SUMMARY OF THE INVENTION

The present invention provides an apparatus and method for identifying the type of incoming call received (blocked, unknown, non-priority or priority incoming calls, as defined below) during a call-in-progress by use of unique audible indicators.

The present invention provides an apparatus and method for processing an incoming call during a call-in-progress. The apparatus and method detect an incoming call from a new caller to a subscriber telephony device, determines whether the subscriber telephony device is busy on a call with a first telephony device, determines interruption information about a second telephony device used for the incoming call when the subscriber telephony device is busy, wherein the interruption information identifies whether the incoming call originates from a blocked, unknown, non-priority or priority caller and generates one of a several unique audible signals which are sent to the subscriber telephony device based on the interruption information.

In one exemplary embodiment the apparatus includes a communication station for detecting an incoming call from a new subscriber telephony device and determining whether the subscriber telephony device is busy on a call with a first telephony device, and an adjunct processor for determining interruption information about the incoming call from the second telephony device (blocked, unknown, non-priority, priority) and generating one of several unique audible signals based on the interruption information. In another exemplary embodiment the above apparatus is contained with the subscriber telephony device.

BRIEF DESCRIPTION OF DRAWINGS

The foregoing and other advantages and features of the invention will become more apparent from the detailed description of preferred embodiments of the invention given below with reference to the accompanying drawings in which.

DETAILED DESCRIPTION OF PREFERRED EMBODIMENTS

Figure 1:
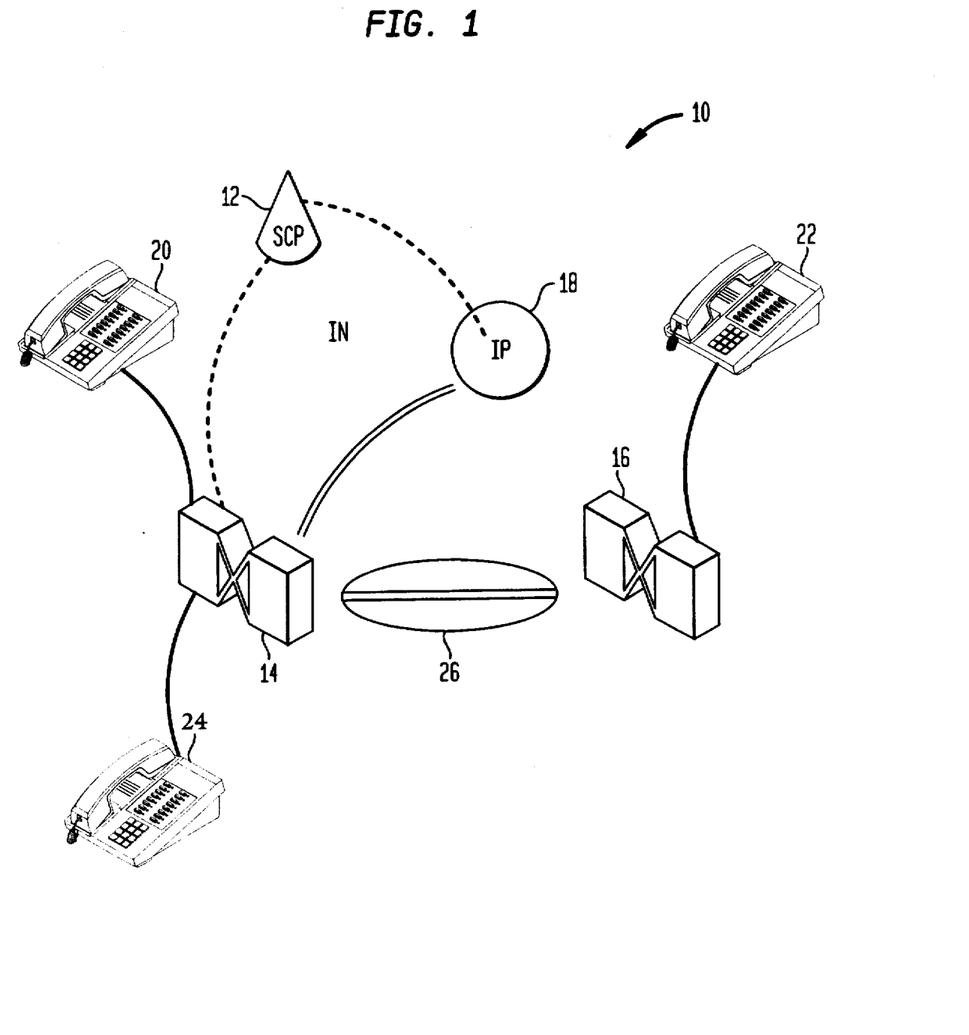
FIG. 1 is a simplified block diagram of a network system architecture suitable for use with the present invention.

Referring now to the drawings, where like reference numerals designate like elements, FIG. 1 shows an exemplary network system 10 which is suitable for implementing the priority call waiting functionality in accordance with the present invention. The network system 10 includes an adjunct processor 12, such as a service control point (SCP), in communication with communication station 14 and/or communication station 16. SCP 12 is provided in communication with communication stations 14 and 16 such as, for example, a service switching point (SSP), via Signaling System No. 7 (SS7) protocol or a similar messaging protocol and system. The network system 10 further includes an intelligent processor (IP) 18 in communication with SCP 12 and SSP 14, 16.

In the exemplary embodiment, network system 10 superimposes on an existing telecommunications system a modular configuration of network elements which provide enhanced telecommunication services. Switching functions are performed by the base network in a conventional manner. The network system 10 may also include IP 18 which provides specialized functionality, such as speech recognition, voice announcements, and speech synthesis capability. The functionality of IP 18 may be implemented in a separate network element, or may be implemented through a multimedia SCP 12.

SSP 14, 16 are switches that operate to recognize service requests, process telephone calls, and request/receive call handling instructions to complete a telephone call. SSP 14, 16 provide intelligent network "triggering"—detecting a condition which requires SSP 14, 16 to initiate the network system 10 service by sending a query to the SCP 12—used by the network system 10 to recognize requests. SSP 14, 16 also formulate and transmit requests to SCP 12 and process replies and requests from SCP 12. SSP 14, 16 create and play intelligent network announcements formulated by the service provider (e.g., the local exchange or interexchange carrier), and transmit event messages (such as busy or no reply signals) to SCP 12.

SCP 12 is a network system 10 element which stores call control and call routing instructions executed by an SSP 14, 16. SCP 12 receives requests from SSP 14, 16 and determines the destination telephone number. SCP 12 receives and processes event messages from SSP 14, 16, and formulates and sends responses to SSP 14, 16. SCP 12 processes accounting and statistical information, such as the number of the calling party, the dialed intelligent network number, duration or type of ringing tone or call waiting signal, and other such call parameters.

As shown, SSP 14 is provided in communication with a subscriber telephony device 20, while SSP 16 is provided in communication with a first telephony device 22. SSP 14 is also provided in communication with a second telephony device 24. Telephony devices 20, 22, 24 may be analog or digital telephones, text-based telephones, computer telephones, or the like, and provided in communication with any similar communication station. Any or all of the telephony devices 20, 22, 24 may be in communication with the same SSP 14, 16 or, alternatively, a different SSPs 14, 16 via a communication network 26, as shown in FIG. 1. The communication network 26 may be either the Public Switched Telephone Network (PSTN), a data network such as, for example, the Internet, or any other similar communication network and may also be connected to a wireless network.

Figure 2:
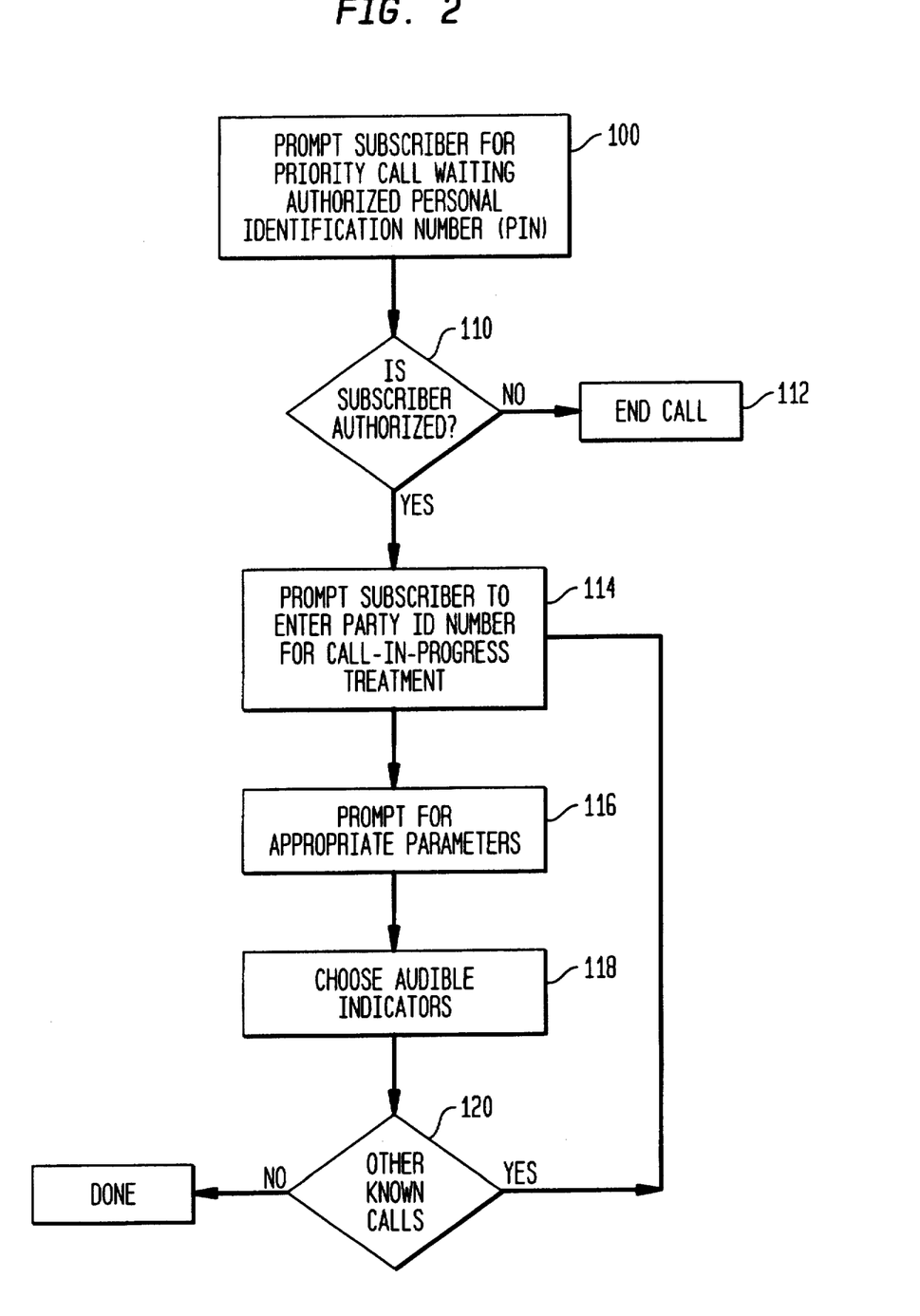
FIG. 2 is a flow diagram illustrating the sequence of steps associated with configuring the network system of FIG. 1 for the priority call waiting feature of the present invention.

FIG. 2 shows a flow diagram illustrating the general sequence of steps associated with configuring the network system of FIG. 1 for the priority call waiting feature in one embodiment of the present invention. The configuration occurs in the SCP 12. The subscriber first calls a configuration number given by the network system 10 provider and is prompted to enter his/her personal identification number (PIN), as shown at block 100. If the PIN indicates that the subscriber is not authorized to access the priority call waiting feature, as determined by conditional block 110, the call is ended as shown at block 112.

If the subscriber is authorized, the subscriber is then prompted to enter an identification (ID) number, for example, a telephone number, an Internet address/call identifier, or the like, identifying a known telephony device for call-in-progress treatment, as shown at block 114. A known telephony device entered may be that of a close friend, family member, business partner, etc. The subscriber then enters appropriate parameters for the telephony device, as shown at block 116. These parameters include, but are not limited to, priority or non-priority. Unknown and blocked calls need not be defined by the subscriber during configuration because network system 10 can identify these types of calls without the subscriber's input. The network system 10 can identify blocked calls since the network system 10 does not receive the identification number for the incoming call from a blocked caller but rather a signal indicating that the incoming call is blocked. The network system 10 can also identify unknown calls since unknown callers are those which have identification numbers which have not been configured by the subscriber and are not blocked.

The subscriber is then prompted to specify the type of call waiting notification to be provided when interruption is authorized, as shown at block 118. This step consists of the subscriber choosing a unique audible tone, from a library of available tones, to indicate a known priority caller and a known non-priority caller. The subscriber may also choose unique tones for unknown callers and blocked calls. If there are other known telephony devices in which the subscriber would like to indicate call-in-progress treatment, the method is repeated, as shown at conditional block 120. The ID numbers and accompanying parameters are stored by SCP 12 at the service provider's site in a profile (database) for the subscriber.

Figure 3:
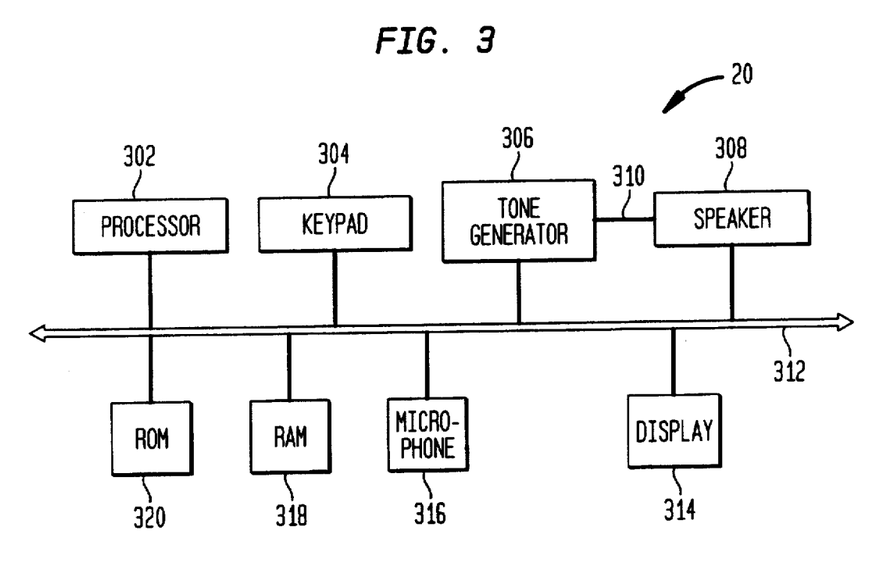
FIG. 3 is a simplified block diagram of a subscriber telephony device suitable for internally employing the priority call waiting feature of the present invention.

In another embodiment the invention is implemented within the subscriber telephony device 20. FIG. 3 illustrates a simplified block diagram of a subscriber telephony device 20 suitable for internally employing the priority call waiting feature of the present invention. Subscriber telephony device 20 includes a processor 302, read only memory (ROM) 320 and random access memory (RAM) 318. The processor reads data from ROM 320 and reads and writes data to RAM 318 over bus 312. ROM 320 stores the Caller ID functionality of the present invention and RAM 318 stores data indicating identity of incoming callers as configured by the subscriber. Subscriber telephony device 20 also includes a keypad 304, microphone 316, display 314, and a speaker 308. The keypad 304 is used during the configuration of the subscriber telephony device as described below. The display 314 shows Caller ID data as well as assists visually when the subscriber is configuring the subscriber telephony device 20. The speaker is connected to bus 312 and also to a tone generator 306 via wireline connection 310. The tone generator 306 generates one of several tones based upon the type of incoming call and that which has been configured for the type of incoming call by the subscriber.

Figure 4:
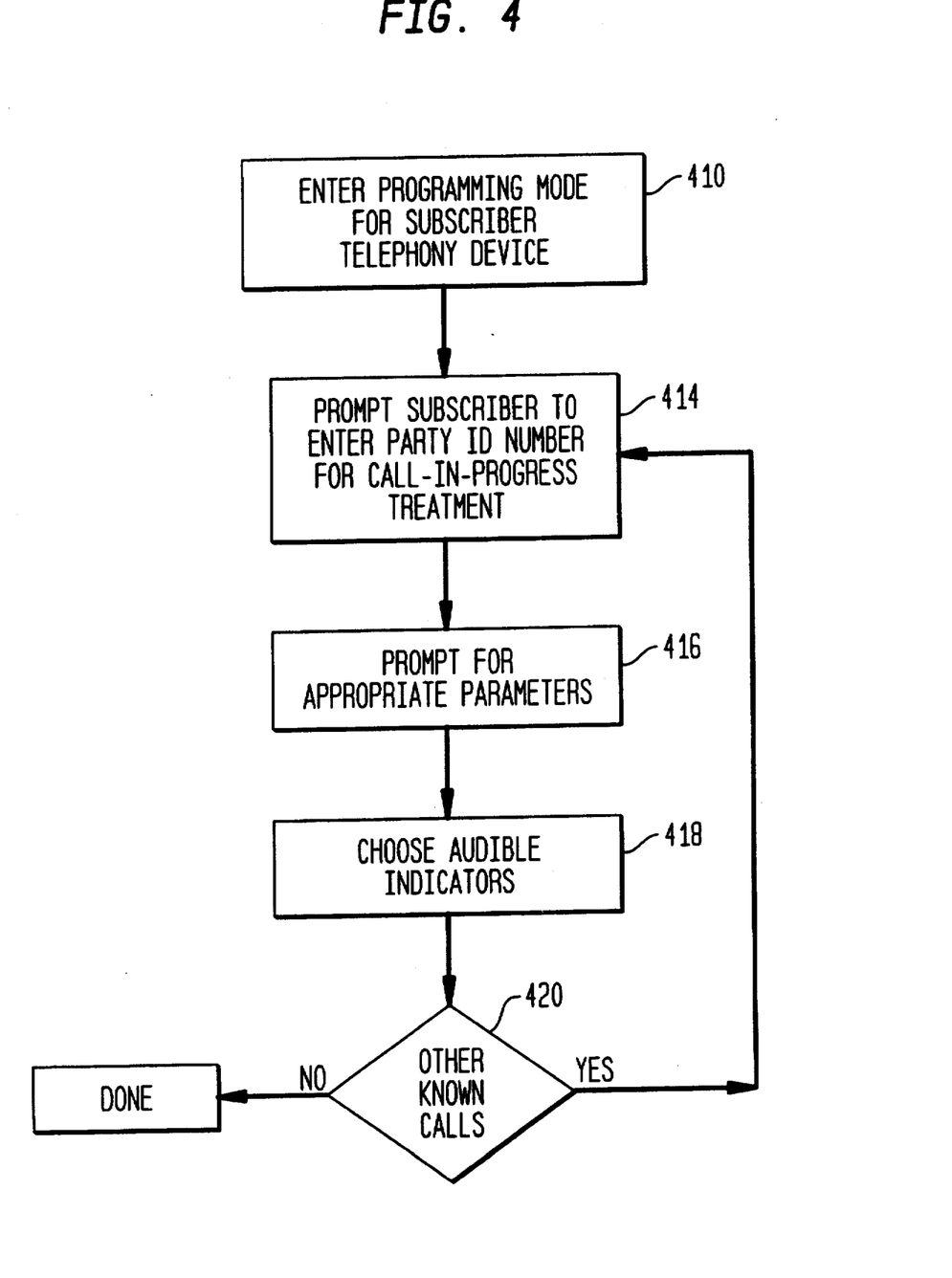
FIG. 4 is a flow diagram illustrating the sequence of steps associated with configuring the subscriber telephony device of FIG. 3 for the priority call waiting feature of the present invention.

FIG. 4 shows a flow diagram illustrating the general sequence of steps associated with configuring the subscriber telephony device 20 of FIG. 3 for the call waiting feature of the present invention. The subscriber first enters a programming mode, in block 410, for the subscriber telephony device 20. This can be done by the subscriber toggling a switch on the subscriber telephony device 20 configured to enable or disable the programming mode. Next, the subscriber is prompted to enter an identification (ID) number, for example, a telephone number, an Internet address/call identifier, or the like, identifying a known telephony device for call-in-progress treatment, as shown at block 414. The subscriber then enters appropriate parameters for the telephony device, as shown at block 416. These parameters include, but are not limited to, priority or non-priority. Unknown and blocked calls need not be defined by the subscriber during configuration because subscriber telephony device 20 can identify these types of calls without the subscriber's input. The subscriber telephony device 20 can identify blocked calls since the network system 10 does not receive the identification number for the incoming call from a blocked caller but rather a signal indicating that the incoming call is blocked. The subscriber telephony device 20 can also identify unknown calls since unknown callers are those which have identification numbers which have not been configured by the subscriber and are not blocked.

The subscriber is then prompted to specify the type of call waiting notification to be provided when interruption is authorized, as shown at block 418. This step consists of the subscriber choosing a unique audible tone, from a library of available tones in the tone generator 306, to indicate a known priority caller and a known non-priority caller. The subscriber may also choose unique tones for unknown callers and blocked calls based upon those available in the tone generator 306. If there are other known telephony devices in which the subscriber would like to indicate call-in-progress treatment, the method is repeated, as shown at conditional block 120. The ID numbers and accompanying parameters are stored in the RAM 318 and the program for above configuration is stored in the ROM 320.

Figure 5:
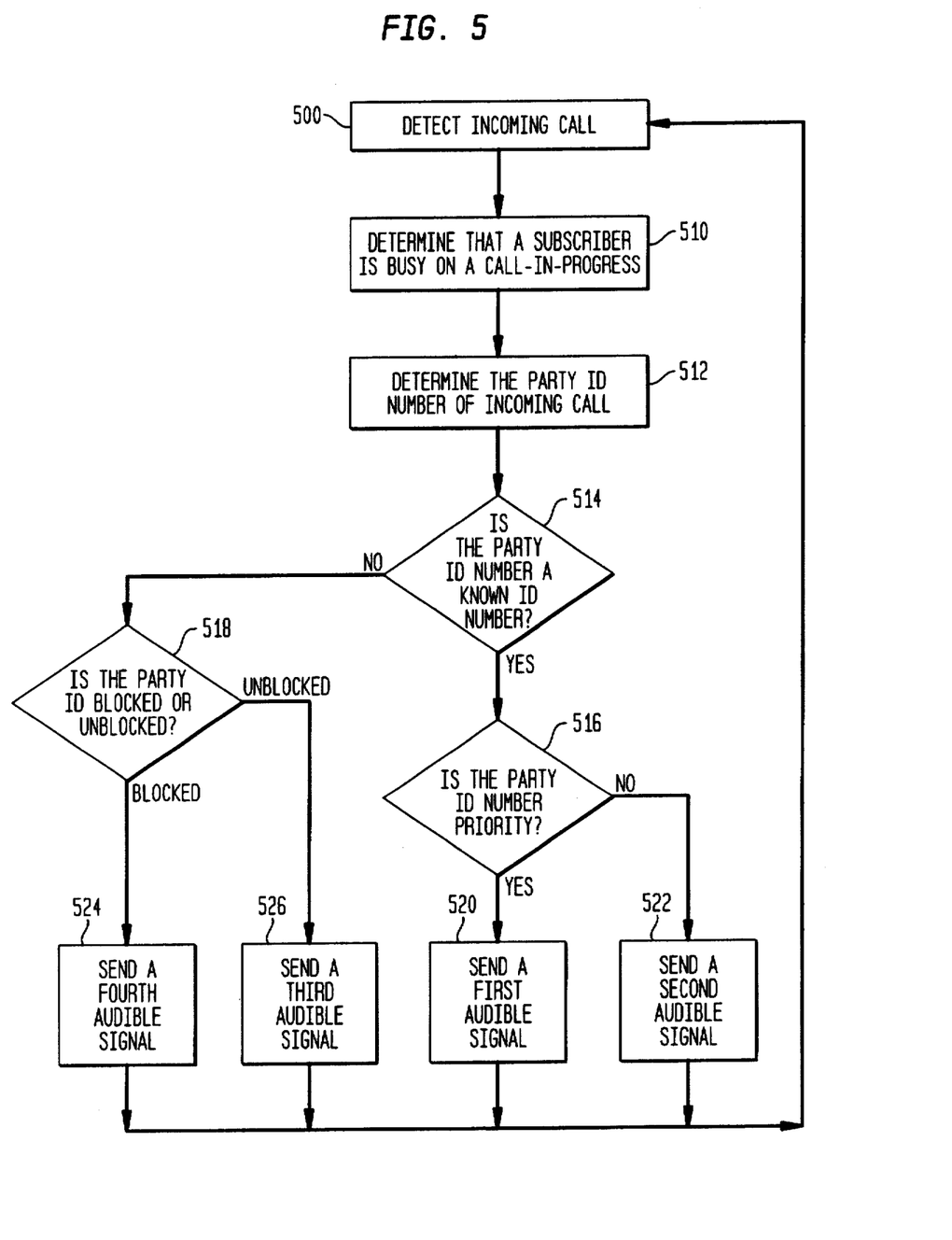
FIG. 5 is a flow diagram illustrating the sequence of steps associated with the processing of the priority call waiting feature for the network system architecture of FIG. 1.

The operation of the priority call waiting feature of the present invention is illustrated utilizing the flow diagram of FIG. 5 depicting processing carried out by SSP14 and SCP12 for network system 10. Assume for purposes of illustration that the subscriber telephony device 20 is busy on a call with a first caller at the first telephony device 22, and that there is an incoming call for subscriber telephony device 20 from a second telephony device 24. The present invention applies whether the subscriber telephony device 20 or the first telephony device 22 initiated the first call. First, an incoming call from second telephony device 24 is detected by SSP 14, block 500. SSP 12 then attempts to route the call to subscriber telephony device 20. SSP 14 detects that subscriber telephony device 20 is busy on another call-in-progress, block 510, which produces a trigger on the busy condition. That is, the busy condition at subscriber telephony device 20 triggers SSP 14 to query SCP 12 for call processing functions.

SCP 12 receives from SSP 14 the inquiry and ID number of the subscriber 20 and the new incoming caller 24, block 512. SCP 12 then accesses a database (subscriber profile) for call processing instructions in accordance with the priority call waiting service subscribed to by subscriber telephony device 20.

SCP 12 then compares the ID number of the incoming call party 24 with the ID numbers stored in the subscriber's profile in the database associated with the SCP 12 to determine if the ID number is that of a known caller as previously configured by the subscriber, block 514. If the ID number exists in the subscriber's profile it is a known ID number and may be a priority or non-priority ID number. If the subscriber's profile indicates the ID number of the second telephony device 24 as a known priority caller, a first audible indication is sent to subscriber telephony device 20, blocks 516, 520. If the subscriber's profile indicates the ID number of the second telephony device 24 as a known non-priority call, a second audible indication is sent to subscriber telephony device 20, blocks 516, 522. If the ID number of the incoming call party 24 is not in the subscriber's profile (unknown), a third audible indication is sent to subscriber telephony device 20, blocks 518, 526. If the ID number of the incoming call party 24 is blocked, a fourth audible indication is sent to subscriber telephony device 20, blocks 518, 524. The appropriate audible indicators are sent by either SSP 14, 16 or IP 18 at the request of SCP 12, as described above.

Figure 6:
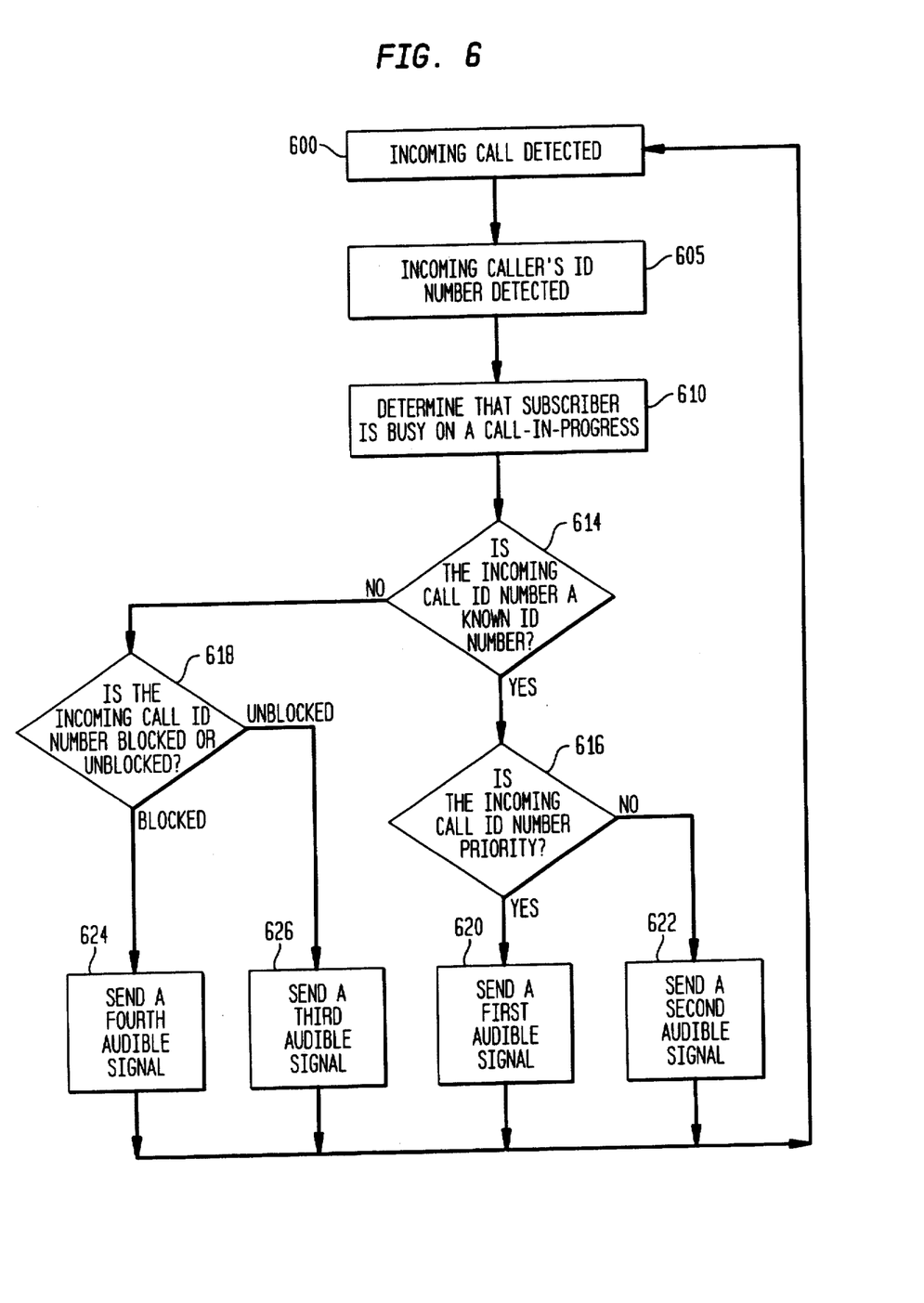
FIG. 6 is a flow diagram illustrating the sequence of steps associated with the processing of the priority call waiting feature for the subscriber telephony device of FIG. 3.

FIG. 6 illustrates the processing for another embodiment of operation of the present invention utilizing a subscriber telephony device 20 which has been configured for the priority call waiting features of the present invention. In this case the processing is carried out at processor 302 in the subscriber's telephony device 20. Assume for purposes of illustration that the subscriber telephony device 20 is busy on a call with a first caller at the first telephony device 22, and that there is an incoming call for subscriber telephony device 20 from a second telephony device 24. The present invention applies whether the subscriber telephony device 20 or the first telephony device 22 initiated the first call. First, an incoming call from second telephony device 24 is detected by subscriber telephony device 20 along with the ID number of the second telephony device 24, blocks 600, 605. Subscriber telephony device 20, querying itself for a dial tone, detects that it is busy on a call with a first telephony device 22, block 610, which produces a trigger on the busy condition. That is, the busy condition triggers subscriber telephony device 20 to query its memory (RAM) 318 for call processing functions for the ID number of the second telephony device 24. The processor 302 then compares the ID number of the incoming call party 24 with the ID numbers stored in the memory 318 to determine if the ID number is that of a known caller as configured, above, by the subscriber, block 614. If the ID number exists in the memory 318 it is a known ID number and may be a priority or non-priority ID number. If the memory 318 indicates the ID number of the second telephony device 24 as a known priority caller, a first audible indication is sent to the tone generator 306, blocks 616, 620. If the memory 318 indicates the ID number of the second telephony device 24 as a known non-priority call, a second audible indication is sent to the tone generator 306, blocks 616, 622. If the ID number of the incoming call party 24 is not in the memory 318 (unknown) and not blocked, a third audible indication is sent to the tone generator 306, blocks 618, 626. If the ID number of the incoming call party 24 is unknown and blocked, a fourth audible indication is sent to the tone generator 306, blocks 618, 624. The appropriate audible indicators are sent by processor 302 to the tone generator 306 which sends an audible signal to the speaker 308. Thus, the present invention allows a subscriber to control which audible notifications of incoming calls are received during a call-in-progress.

In addition to the above described features, the present invention also allows a priority incoming caller, who knows that they are a priority caller for a subscriber telephony device 20, to disable the priority indicator at subscriber telephony device 20. For example, in a preferred embodiment the priority incoming caller can enter the prefix "*75" (or other configured disabling code) when dialing the subscriber such that when the incoming call is received by subscriber telephony device 20, subscriber telephony device 20 will identify the call from the priority caller as a call from an unknown caller. This feature enables a priority caller to avoid disturbing the subscriber if the subject matter of the priority caller's call is unimportant as determined by the priority caller.

It is to be understood that the above description is intended to be illustrative and not restrictive of the invention. Many variations to the above-described system and method will be readily apparent to those having ordinary skill in the art. For example, in a network which utilizes IP addresses, such as the Internet, the same method may be employed by substituting the above described identification numbers with IP addresses. Also, other non-visual indicators for the priority of an incoming call may be used. For example, the subscriber telephony device 20 of network system 10 may use a beep with the same tone but different number of beeps for different priorities, i.e. one beep for a known priority caller, 2 beeps for a known non-priority caller, etc. In addition, a number of vibrations or different types of vibrations of a vibrating transducer can be used to provide the different indicators employed in the invention.

Accordingly, the scope of the present invention is not to be considered as limited by the specifics of the particular system and method which have been described and illustrated, but is only limited by the scope of the appended claims.

What is claimed as new and desired to be protected by Letters Patent of the United States is:

1. A method for processing an incoming communication call for a user communication device during the existence of an in-progress communication at said user communication device, said method comprising:
    detecting an incoming communication call during said in-progress communication;
    determining an identification of a communication device originating said incoming call;
    determining a non-visual indicator associated with said identification; and
    providing said determined indicator at said user communication device.

2. The method as recited in claim 1, wherein said indicator is an audible tone.

3. The method as recited in claim 1, wherein said indicator is at least one of a plurality of audible indicators, each providing a unique information to a user of said user communication device.

4. The method as recited in claim 1, wherein said indicator is a vibration signal.

5. The method as recited in claim 1, wherein said indicator is at least one of a plurality of vibrational indicators, each providing unique information for a user of said user communication device.

6. The method as recited in claim 1, wherein said act of determining said identification includes determining a telephone number of said communication device originating said incoming call.

7. The method as recited in claim 1, wherein said act of determining said identification includes determining an Internet address of said communication device originating said incoming call.

8. The method as recited in claim 1, wherein said act of providing includes providing an indicator which indicates that said identification of said communication device originating said incoming call is a known priority identification.

9. The method as recited in claim 1, wherein said act of providing includes providing an indicator which indicates that said identification of said communication device originating said incoming call is a known non-priority identification.

10. The method as recited in claim 1, wherein said act of providing includes providing an indication which indicates that said identification of said communication device originating said incoming call is an unknown identification.

11. The method as recited in claim 1, wherein said act of providing includes providing an indicator which indicates that said identification of said communication device originating said incoming call is a blocked identification.

12. The method as recited in claim 8, wherein said communication device originating said incoming call having said known priority identification disables said indicator indicating said known priority call.

13. A method of storing information concerning a potential calling device for a subscriber telephony device, said method comprising:
    storing in association with said subscriber telephony device an identification of a potential incoming calling device; and
    storing information representing a non-visual indicator to be provided at said subscriber telephony device in association with said identification when said subscriber telephony device is busy and an incoming call is originated by said potential incoming calling device.

14. The method as recited in claim 13, wherein said identification comprises an identification number.

15. The method as recited in claim 14, wherein said identification number comprises a telephone number.

16. The method as recited in claim 13, wherein said identification comprises an Internet address.

17. The method as recited in claim 13, wherein said information representing said indicator represents a priority indicator.

18. The method as recited in claim 13, wherein said information representing said indicator represents a non-priority indicator.

19. The method as recited in claim 13, wherein said storing occurs in a communications network to which said subscriber telephony device is connectable.

20. The method as recited in claim 13, wherein said storing occurs in said subscriber telephony device.

21. A system for processing an incoming call during a call-in-progress, said system comprising:
    a first circuit for detecting an incoming call from a second telephony device to a subscriber telephony device and determining whether said subscriber telephony device is busy on a call with a first telephony device; and
    a second circuit for determining identification information of said second telephony device when said subscriber telephony device is busy, identifying a non-visual indicator associated with said identification information, and providing said identified non-visual indicator at said subscriber telephony device having a call-in-progress with said first telephony device.

22. The system as recited in claim 21, wherein said first circuit includes a communication station.

23. The system as recited in claim 22, wherein said communication station includes a service switching point.

24. The system as recited in claim 21, wherein said second circuit includes a service control point.

25. The system as recited in claim 21, wherein said second circuit includes a processor, said processor determining said identification information and said indicator associated with said identification information.

26. The system as recited in claim 21, wherein said first circuit comprises a switching circuit.

27. The system as recited in claim 21, wherein said indicator is an audible tone.

28. The system as recited in claim 21, wherein said signal is at least one audible tone, each of said indicators sending a unique number of said audible tones to said subscriber telephony device.

29. The system as recited in claim 21, wherein said signal is a vibration signal, said vibration signal unique for each indicator.

30. The system as recited in claim 21, wherein said signal is at least one vibration signal, each of said indicators sending a unique number of said vibration signals to said subscriber telephony device.

31. A telephone network for processing an incoming call during a call-in-progress, said telephone network comprising:

a first circuit for detecting an incoming call from a second telephony device to a subscriber telephony device and determining whether said subscriber telephony device is busy on a call with a first telephony device; and a second circuit for determining identification information of said second telephony device when said subscriber telephony device is busy, identifying a non-visual indicator associated with said identification information said sending a signal in response to said identified non-visual indicator to said subscriber telephony device having a call-in-progress with said first telephony device.

32. The telephone network as recited in claim 31, wherein said first circuit includes a communication station.

33. The telephone network as recited in claim 32, wherein said communication station includes a service switching point.

34. The telephone network as recited in claim 31, wherein said second circuit includes a service control point.

35. The telephone network as recited in claim 31, wherein said second circuit includes a processor, said processor determining said identification information and said indicator associated with said identification information.

36. The telephone network as recited in claim 31, wherein said first circuit comprises a switching circuit.

37. The telephone network as recited in claim 31, wherein said signal is an audible tone, said audible tone unique for each indicator.

38. The telephone network as recited in claim 31, wherein said signal is at least one audible tone, each of said indicators sending a unique number of said audible tones to said subscriber telephony device.

39. The telephone network as recited in claim 31, wherein said signal is a vibration signal, said vibration signal unique for each indicator.

40. The telephone network as recited in claim 31, wherein said signal is at least one vibration signal, each of said indicators sending a unique number of said vibration signals to said subscriber telephony device.

41. A subscriber telephone device for processing an incoming call during a call-in-progress, said device comprising:

a memory for storing known identification information representing associated non-visual indicators; and a processor for detecting an incoming call from a second telephony device to a subscriber telephony device, determining whether said subscriber telephony device is busy on a call with a first telephony device, determining a identification information of said second telephony device when said subscriber telephony device is busy on a call, and extracting from said identification information representing a non-visual indicator associated with said identification information of said second telephony device; and an indicator generator for generating an indication in response to said extracted information.

42. The device as recited in claim 41, wherein said memory includes read only memory.

43. The device as recited in claim 41, wherein said indicator is an audible tone, said audible tone unique for each indicator.

44. The device as recited in claim 41, wherein said indicator at least one audible tone, each of said indicators sending a unique number of said audible tones to said subscriber telephony device.

45. The device of claim 43 or 44 further comprising a tone generator, said tone generator generating said audible tones in response to said indicator.

46. The device as recited in claim 41, wherein said indicator is a vibration signal, said vibration signal unique for each indicator.

47. The device as recited in claim 41, wherein said indicator at least one vibration signal, each of said indicators sending a unique number of said vibration signals to said subscriber telephony device.

48. The device of claim 46 or 47 further comprising an transducer, said transducer generating said vibration signals in response to said indicator.

\* \* \* \* \*